United States Patent [19]

Brashears et al.

[11] Patent Number: 5,170,726
[45] Date of Patent: Dec. 15, 1992

[54] APPARATUS AND METHODS FOR REMEDIATING MATERIALS CONTAMINATED WITH HYDROCARBONS

[75] Inventors: David F. Brashears, Belle Isle; Edward E. Harwood, Orlando; Alfred A. Dishian, Longwood, all of Fla.

[73] Assignee: Thermotech Systems Corporation, Orlando, Fla.

[21] Appl. No.: 792,279

[22] Filed: Nov. 18, 1991

[51] Int. Cl.⁵ .......................... F23G 5/04; F23G 5/20
[52] U.S. Cl. ........................... 110/236; 110/346; 34/79; 432/14
[58] Field of Search ............... 110/236, 246, 346; 48/202, 203, 206; 34/79, 134; 432/14, 105, 106

[56] References Cited

U.S. PATENT DOCUMENTS

| | | | |
|---|---|---|---|
| 3,618,537 | 11/1971 | Bogue | 110/8 |
| 3,763,572 | 10/1973 | Titus | 34/58 |
| 4,374,650 | 2/1983 | Garside | 48/202 |
| 4,374,704 | 2/1983 | Young | 202/117 |
| 4,378,206 | 3/1983 | Kullendorff et al. | 431/170 |
| 4,431,405 | 2/1984 | Eatherton | 432/72 |
| 4,563,246 | 1/1986 | Reed et al. | 202/100 |
| 4,572,781 | 2/1986 | Krasuk et al. | 208/309 |
| 4,640,681 | 2/1987 | Steinbiss et al. | 432/14 |
| 4,667,609 | 5/1987 | Hardison | 110/236 |
| 4,700,638 | 10/1987 | Przewalski | 110/346 |
| 4,748,921 | 6/1988 | Mendenhall | 110/346 |
| 4,815,398 | 3/1989 | Keating, II et al. | 110/233 |
| 4,827,854 | 5/1989 | Collette | 110/237 |
| 4,864,942 | 9/1989 | Fochtman et al. | 110/226 |
| 4,945,839 | 8/1990 | Collette | 110/212 |
| 4,947,767 | 8/1990 | Collette | 110/212 |
| 4,951,417 | 8/1990 | Gerken et al. | 47/1.42 |
| 4,961,391 | 10/1990 | Mak et al. | 110/346 |
| 4,974,528 | 12/1990 | Barcell | 110/240 |
| 5,005,493 | 4/1991 | Gitman | 110/246 |
| 5,072,674 | 12/1991 | Noland et al. | 110/236 X |

Primary Examiner—Henry A. Bennet
Attorney, Agent, or Firm—Nixon & Vanderhye

[57] ABSTRACT

The remediation apparatus includes a pair of heating units, e.g., rotary drum dryers, each having a contaminated material inlet and a burner at opposite ends whereby the contaminated material and hot gases of combustion are in heat exchange, preferably counterflow relation. Material-bearing hydrocarbon contaminants are heated in the first drum to volatilize the low boiling fraction. The soil is conveyed to the second drum and heated to a higher temperature to volatilize the intermediate and high boiling fractions. The volatilized contaminants from the second drum are returned to the burner of the first drum for at least partial oxidation and reduction of the higher fractions to lower fractions. The dust and gases exiting the first drum flow to a baghouse for separation into dust and volatilized contaminants. The dust is returned to the soil. The volatilized contaminants are further eliminated, e.g., by oxidation.

33 Claims, 1 Drawing Sheet

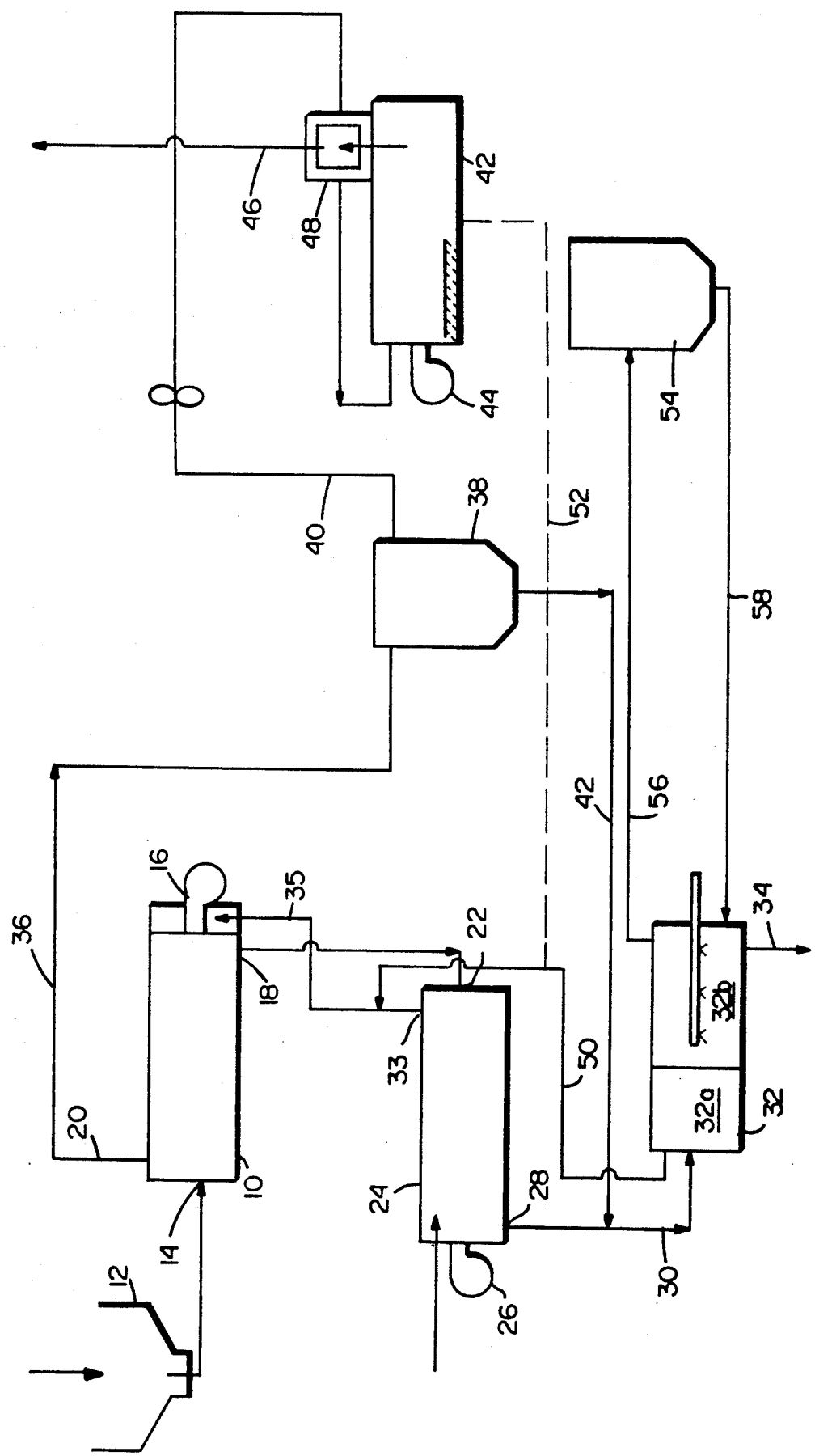

APPARATUS AND METHODS FOR REMEDIATING MATERIALS CONTAMINATED WITH HYDROCARBONS

BACKGROUND AND SUMMARY OF THE INVENTION

The present invention relates to apparatus and methods for remediating materials contaminated with hydrocarbons, and particularly relates to apparatus and methods using a tandem dryer arrangement for sequentially volatilizing the low boiling fraction and the remaining higher boiling fractions of the volatile organic contaminants in the materials undergoing remediation and subsequently eliminating, e.g., oxidizing all such volatilized components. Particularly, the present invention relates to apparatus and methods for remediating soil contaminated with hydrocarbons.

While the preferred embodiment of the present invention is described herein in relation to remediation of soil contaminated with hydrocarbons, it will be appreciated that materials other than soil may be remediated by the practice of this invention. For example, the present invention may be used to eliminate volatile organics from metal turnings, sludges, drilling muds, inorganic chemicals, etc.

Soils are frequently contaminated with volatile organics, i.e., hydrocarbon products, and this constitutes a highly significant and major pollution problem. The contaminants may range from gasoline through heavy hydrocarbon products and hydrocarbon chemicals, such as PCBs. Various efforts have been directed to remediating the soil and one of the most effective is to thermally treat the soil. High cost, however, is an inhibiting factor and, in many cases, is the result of inefficiently designed equipment and limited equipment capacities. For example, a major factor affecting the cost is fuel efficiency as well as the downstream treatment of the residual gaseous components driven off from the soil. Thermal efficiency is often disregarded in many systems. For example, heat recovery and high temperature fume incineration is frequently ignored.

In these prior systems, the basic process for cleaning the soil is to expose it to high temperatures, where the contaminants are volatilized and subsequently oxidized or processed in a reducing environment to leave a carbon char material in the soil. The temperatures at which the soils must be processed can vary substantially from as low as 150° F. to over 1100° F. in order to obtain satisfactory low levels of total residual petroleum hydrocarbons. With these wide-ranging temperatures necessary to clean up a wide variety of contaminants, it is essential to design a remediation system which not only effectively removes the contaminants but does so in a thermally efficient and, hence, fuel-efficient manner.

A significant additional problem in soil remediation resides in the system's ability to separate the soil dust from volatilized hydrocarbons without adversely affecting the efficiency of the separator. A separator for use in soil remediation processes may comprise a baghouse having a series of bags depending from a support structure, the volatilized hydrocarbon gases passing through the bags for subsequent elimination, e.g., oxidation and the dust being separated out for further remediation, e.g., by return to the heated hydrocarbon contaminant-free soil. It will be appreciated that the hydrocarbon contaminants contain low, intermediate and high boiling fractions having different condensation temperatures. Considering the materials of the baghouse filter bags, and without utilizing exotic and, hence, expensive bag materials, the maximum operating temperature of a baghouse is about 400°–450° F. With exotic bag materials, the maximum baghouse temperature may reach about 550° F. Such exotic materials, however, have decreased separation capacity and are generally not desirable. At or below that maximum operating temperature for the baghouse, it will be appreciated that certain of the intermediate and high boiling fractions will condense. Should this occur, these heavier hydrocarbon fractions will condense either back onto the soil or will be carried into the baghouse and form liquid droplets and eventually an oil film covering the interstices of the bags. Consequently, the efficiency of the baghouse filters deteriorates and the possibility of a fire in the baghouse is substantially increased.

According to the present invention, there is provided a first-stage heating unit, e.g., a rotatable drum dryer. This first dryer preferably has a burner at one end and an inlet at its opposite end for receiving the contaminated soil whereby the contaminated soil is heated, preferably in counterflow relation to the hot gases of combustion. While a rotatable drum dryer is preferred, particularly for soil remediation, other types of dryers may be used such as a fluid bed, flash or a rotary hearth dryer. The first unit is operated in a relatively low temperature range, for example, on the order of 150°–450° F., such that only the low boilers of the low boiling fraction are volatilized. The first unit also evaporates the moisture content of the contaminated soil. The partially remediated soil is then passed to a second-stage heating unit, e.g., a second rotatable drum, which similarly and preferably has a burner at one end and an inlet at the opposite end for receiving the partially contaminated soil from the first-stage heating unit. The soil passes through the second drum, preferably in counterflow relation to the combustion gases. Importantly, the second-stage heating unit is operated at a temperature substantially higher than the operating temperature of the first-stage heating unit. Consequently, the remaining intermediate and high boiling fractions consisting of the intermediate and high boilers are volatilized. The soil exiting the second unit is therefore substantially free of hydrocarbon contaminants and exits the second unit at an elevated temperature. The contaminated free soil is then passed through a cooler, where its temperature is reduced and water is added to return the soil to its proper moisture levels.

A significant feature of the present invention resides in passing the remaining volatilized contaminants from the second-stage heating unit to the burner of the first-stage heating unit. Substantially all of the volatilized contaminants received from the second unit are at least partially oxidized by the burner of the first unit. Thus, the intermediate and high boilers of the second unit are used as a source of fuel for the burner of the first unit. By at least partially oxidizing these contaminants received from the second unit, portions of the intermediate and higher fractions are converted to the lower fractions or lighter oils. Exhaust gases from the first unit thus include the portion of the contaminants volatilized in the first unit, any remaining non-oxidized volatilized portion of the remaining contaminants from the second unit and dust from the contaminated soil. Importantly, the temperature of the exhaust gas stream from the first unit does not exceed the maximum operating temperature of the separator, e.g., the baghouse Without exotic filter bag materials, the baghouse operating temperature should not exceed about 400° F. The baghouse, therefore. efficiently separates the dust and the volatilized hydrocarbons one from the other without danger of hydrocarbon contaminants condensing on the filter bags.

To the extent the dust separated in the baghouse contains hydrocarbon contaminants, those contaminants are subsequently eliminated. For example, such dust may be returned for mixing with the heated hydrocarbon contaminant-free soil exiting the second unit. The elevated temperature of that soil volatilizes any residual hydrocarbons for later elimination. The off-gases containing the residual volatilized hydrocarbons may then be conveyed to a thermal oxidizer for complete incineration and destruction. Other methods may be used to destroy these residual volatilized hydrocarbons, for example, by carbon adsorption, chemical reaction, condensation or the like. Alternatively, the dust may be remediated by other methods and later combined or not with the remediated soil.

As an added efficiency, the exhaust gases from the preferred thermal oxidizer may be disposed in heat exchange relation with the incoming volatilized exhaust gases from the separator prior to those gases passing into the thermal oxidizer. Consequently, the exhaust gases of the thermal oxidizer preheat the volatilized exhaust gases from the first-stage heating unit before they enter the thermal oxidizer, thereby economizing fuel and increasing efficiency.

Accordingly, in a preferred embodiment of the present invention, there is provided apparatus for remediating material contaminated with hydrocarbons, comprising a first-stage heating unit for receiving the contaminated material, means for heating the material in the first-stage heating unit to a first predetermined temperature to volatilize a portion of the hydrocarbon contaminants in the contaminated material and a second-stage heating unit for receiving the heated material from the first-stage heating unit. Means are provided for heating the material in the second-stage heating unit to a second predetermined temperature higher than the first predetermined temperature to volatilize substantially all of the remaining hydrocarbon contaminants in the contaminated material leaving substantially contaminant-free material. Means are provided for conveying the volatilized remaining contaminants from the second-stage heating unit to the heating means of the first-stage heating unit and means including the heating means of the first-stage heating unit are used for at least partially oxidizing substantially all of the remaining volatilized contaminants received from the second-stage heating unit. There is also provided a separator and means for conveying gases from the first-stage heating unit including the portion of the contaminants volatilized in the first-stage heating unit, any remaining non-oxidized volatilized portion of the remaining contaminants from the second-stage heating unit and any air-borne particulate matter from the contaminated material to the separator, the separator separating the volatilized gases and the particulate matter one from the other into discrete exhaust streams, respectively, and means for eliminating the hydrocarbons in the volatilized exhaust gas stream from the separator.

In a further preferred embodiment of the present invention, there is provided apparatus for remediating contaminated soil including a first-stage heating unit for receiving the contaminated soil, a burner for heating the soil in the first unit to a first predetermined temperature to volatilize a portion of the contaminants in the contaminated soil, a second-stage heating unit for receiving the heated soil from the first unit and a burner for heating the soil in the second dryer to a second predetermined temperature higher than the first predetermined temperature to volatilize substantially all of the remaining contaminants in the contaminated soil leaving substantially contaminant-free soil. Means are provided for conveying the volatilized remaining contaminants from the second unit to the burner of the first unit, in combination with means including the burner of the first unit for at least partially oxidizing substantially all of the remaining volatilized contaminants received from the second unit. There is also provided a separator and means for conveying gases from the first unit including the portion of the contaminants volatilized in the first unit, any remaining non-oxidized volatilized portion of the remaining contaminants from the second unit and any dust from the contaminated soil to the separator, the separator separating the volatilized gases and the dust one from the other. The apparatus further includes means for oxidizing the volatilized gases from the separator.

In a further preferred embodiment according to the present invention, there is provided a method for remediating soil contaminated with hydrocarbons comprising the steps of disposing soil contaminated with hydrocarbons in a first-stage heating unit, heating the soil in the first unit to a first predetermined temperature to volatilize a portion of the contaminants in the contaminated soil, disposing the heated soil from the first unit in a second-stage heating unit, heating the soil in the second unit to a second predetermined temperature higher than the first predetermined temperature to volatilize substantially all of the remaining contaminants in the contaminated soil leaving substantially contaminant-free soil, conveying the volatilized remaining contaminants from the second unit to the burner of the first unit, at least partially oxidizing substantially all of the remaining volatilized contaminants received from the second unit by the burner of the first unit, conveying gases from the first unit including the portion of the contaminants volatilized in the first unit, any remaining non-oxidized volatilized portion of the remaining contaminants from the second unit and any dust from the contaminated soil to a separator, separating the volatilized gases and the dust one from the other in the separator and oxidizing the volatilized gases separated in the separator.

Accordingly, it is a primary object of the present invention to provide novel and improved apparatus and methods for remediating material contaminated with hydrocarbons.

These and further objects and advantages of the present invention will become more apparent upon reference to the following specification, appended claims and drawings.

BRIEF DESCRIPTION OF THE DRAWING FIGURES

The sole drawing FIGURE is a schematic representation of apparatus and methods employed in material remediation according to the present invention.

DETAILED DESCRIPTION OF THE DRAWING FIGURES

Reference will now be made in detail to a present preferred embodiment of the invention, an example of which is illustrated in the accompanying drawings.

From the foregoing, it will be appreciated that the present invention is useful for eliminating hydrocarbon contaminants from a wide variety of materials, for example, sludges, drilling muds, metal turnings, inorganic chemicals and has particular applicability to remediating hydrocarbon-contaminated soil. Thus, while the following detailed description is written in terms of remediating hydrocarbon-contaminated soil, it will be appreciated that it has applicability to the remediation of other hydrocarbon-contaminated materials.

Referring now to the sole drawing FIGURE, there is illustrated apparatus for remediating soil contaminated with hydrocarbons including a first-stage heating unit, for example, a rotatable drum dryer 10 for receiving contaminated soil from a hopper 12 or other suitable soil delivery apparatus. Rotary drum dryer 10 preferably has an inlet 14 for receiving contaminated soil at one end of the dryer and a burner 16 at its opposite end. The cylindrical interior surface of dryer 10 is preferably provided with a plurality of circumferentially and axially spaced flights, not shown, whereby, upon rotation of the dryer about its axis, the contaminated soil is lifted and permitted to veil through the hot gases passing through the dryer. It will be appreciated that the hot gases of combustion are in counterflow relation to the direction of travel of the contaminated soil within the dryer. A soil outlet 18 is disposed adjacent the burner end of dryer 10. Also, disposed adjacent the inlet end of dryer 10 is an exhaust gas outlet 20. While a rotatable drum dryer is the preferred form of dryer for the first-stage heating unit hereof, other types of dryers, for example, fluidized bed, flash or rotary hearth dryers may be used to achieve the thermal drying of the material inlet to the first-stage heating unit.

The partially remediated soil from the first dryer 10 flows, by a suitable conveying means, through inlet 22 into a second-stage heating unit 24. Unit 24 is preferably a high-temperature heating and volatilizing unit, e.g., a rotary drum lined with a refractory material or material capable of withstanding high temperatures. At the opposite end of unit 24 from inlet 22, there is disposed a burner 26 whereby the hot gases of combustion from burner 26 and the soil flowing into drum unit 24 through inlet 22 are in counterflow relation one to the other. The second unit 24 is operated at a higher temperature than the first unit 10. The intermediate and high boiling fractions consisting of the intermediate and high boilers, i.e., the remainder of the hydrocarbon boiling fractions not volatilized in the first unit, are therefore volatilized in the second unit 24. Unit 24 is therefore essentially a desorber, i.e., a unit which thermally drives organics from the soil. Consequently, the soil, upon exiting the second unit 24 at outlet 28, is substantially free of hydrocarbon contaminants. This soil is conveyed, as indicated at 30, to a cooler 32 where the soil, at elevated temperature, is cooled and remoisturized by the addition of cooling water. The remoisturized remediated soil is outlet at 34 from cooler 32 for suitable disposition.

Cooler 32 may comprise a single rotary drum with tandem compartments. A first compartment 32a may receive the heated contaminant-free soil for mixing with dust from the soil (as described hereinafter) for remediating the dust at high temperatures. A second compartment 32b receives the mixed soil and a spray apparatus may apply water to the soil to remoisturize it.

A significant feature of the present invention resides in employing the volatilized contaminants from the second unit as fuel for the burner 16 of the first unit 10. These volatilized contaminants exit the second unit 24 at outlet 33 for conveyance to burner 16 or for flow into the flame. Thus, substantially all of the volatilized contaminants received from the second unit are at least partially oxidized by the burner 16 of the first unit 10. Also, certain of the volatilized intermediate and high boiling fraction contaminants from the second unit 24 are reduced to the lower boiling fractions. As a consequence, the gases exhausting from the first unit 10 at the exhaust gas outlet 20 include the portion of the contaminants volatilized in unit 10, i.e., the low boilers, any remaining non-oxidized, volatilized portion of the remaining contaminants from the second unit and any dust from the contaminated soil.

Because the temperature in the first unit is maintained in a range such that the temperature of the exhaust gases lies at or below the maximum operating temperature of the separator, the exhaust gases may flow via line 36 to a separator 38 without condensing any of the volatilized hydrocarbons. Separator 38 is preferably a baghouse which conventionally has a plurality of filtration bags, not shown, which depend from a support structure for separating the soil dust and the volatilized contaminants one from the other. Typically, the gas stream flowing into the baghouse 38 via line 36 is exposed to the bags with the dust unable to penetrate the bags. The dust therefore settles out, while the volatilized contaminants flow through the bags for egress from separator 38 via line 40.

As illustrated, the dust separated in separator 38 from the volatilized contaminants flows via line 42 for combination with the hydrocarbon contaminant-free soil exiting the second unit 24. That is, line 42 communicates with line 30 whereby the combined soil and dust is supplied cooler 32 for cooling and remoisturizing.

The volatilized contaminants separated from the gas stream in baghouse 38 are eliminated before the gases are set free into the atmosphere. Preferably, this is accomplished in a thermal oxidizer 42, although it will be appreciated that other apparatus could be used to eliminate the volatile organic compounds from the exhaust gas stream. For example, carbon adsorption, chemical reaction, and condensation equipment may be used. The preferred thermal oxidizer 42 includes a burner 44 for incinerating the volatilized contaminants. To improve fuel efficiencies and other economies, the gas stream 40 containing the volatilized contaminants first passes in heat exchange relation with the exhaust 46 from the thermal oxidizer in a heat exchanger 48. The exhaust gases from the thermal oxidizer thus preheat the volatilized contaminants before their oxidation in the thermal oxidizer 42. The exhaust gases then flow to a stack, not shown, for return to the atmosphere.

In use, the contaminated soil is conveyed from hopper 12 into the first unit 10 for heat exchange relation with the hot combustion gases from burner 16, preferably a counterflow heat exchange relation. The first unit 10 is essentially a low temperature drying operation for vaporizing the moisture contained in the soil and also for volatilizing the low boiling fraction consisting of the low boilers of the hydrocarbon contaminants on the soil. These are the volatilized contaminants which will not condense out at the maximum operating temperature of the baghouse. Thus, the first unit 10 is preferably operated in a range to provide a soil discharge temperature of about 150°–450° F., the temperature being adjustable depending upon the nature of the hydrocarbons contained in the contaminated soil and preferably at a range of 200°–350° F. Stated differently, the soil discharge temperature from first unit 10 should be low enough to retain the heavy and intermediate hydrocarbon fractions in the soil without volatilization.

The second-stage heating unit 24 receives the partially remediated soil which remains contaminated with the intermediate and high boiling fractions comprising the intermediate and high boilers. The second unit 24 is operated at a higher temperature than the first dryer. For example, it may be operated within a range of 200°–1500° F. and is preferably operated within a range of 1000°–1100° F. As a consequence, the intermediate and high boilers are volatilized and the soil discharged the second unit is accordingly substantially free of hydrocarbon contaminants. The soil is conveyed to the cooler 32 for cooling and remoisturization whereupon it constitutes wholly remediated soil. The exhaust gases carrying the intermediate and high boilers from the second unit 24 are input via line 35 to burner 16 of the first unit 10 or its flame at a relatively high temperature, i.e., on the order of 300°–800° F. Burner 16 thus at least partially oxidizes substantially all of the volatilized contaminants received from the second unit.

It will be appreciated that the quantity of fuel necessary to maintain burner 16 operating sufficiently to provide a first unit temperature within the prescribed range of about 150°–450° F. and preferably in a range of 200°–350° F. may be less than the fuel supplied to the burner by the volatilized contaminants received from the second unit. Consequently, not all of the volatilized contaminants received from the second unit are completely oxidized by the burner 16 or its flame. However, they are reduced toward the lower boiling fractions such that the volatilized contaminants exiting the first unit at outlet 20 are at a temperature at or below the maximum operating temperature of the baghouse 38. Thus, all of the volatilized contaminants from the first and second-stage heating units and the dust from the contaminated soil exit the first unit 10 via line 36 for passage through the separator. The temperature of those materials does not exceed the maximum operating temperature of the separator and may be up to about 400°–450° F., but is preferably lower. The dust is separated from the volatilized contaminants in separator 38.

The dust may contain residual hydrocarbon contaminants. To eliminate those, the dust is remediated separately by a thermal or other reaction process. Preferably, the dust is returned via line 30 to the soil discharged from the second unit 24 at elevated temperatures. Those elevated temperatures are sufficient to drive off the residual volatile organic compounds on the dust. These off-gases may be removed from the cooler 32, i.e., the mixer 32a, by a conduit 50 connected to line 35 for ultimate oxidation in burner 16, or by conduit 52, indicated by the dashed line, for oxidation in thermal oxidizer 42. In any event, the off-gases containing the volatilized residual contaminants on the dust are eliminated by oxidation via lines 50 and 35 by burner 16 or via lines 50 and 52 by thermal oxidizer 42, respectively. Of course, other apparatus, such as those noted previously, may be used to eliminate these residual contaminants.

The volatilized contaminants separated from the dust at separator 38 are passed to the thermal oxidizer 42. They are, however, first preheated by placing them in heat exchange relation with the products of oxidation from thermal oxidizer 42 in heat economizer 48. These preheated volatilized contaminants are subsequently incinerated in oxidizer 42 and the exhaust products of oxidation are passed to a stack, not shown.

There may also be provided an auxiliary baghouse 54. Steam generated in cooler 32b upon remoisturization of the soil may carry with it dust from the remediated soil. This hydrocarbon-free steam-carried dust may flow via line 56 to baghouse 54 for separation. The dust separated from the steam at baghouse 54 may be returned to the remediated soil via line 58.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

what is claimed is:

1. Apparatus for remediating material contaminated with hydrocarbons, comprising:
    a first-stage heating unit for receiving the contaminated material;
    means for heating the material in said first-stage heating unit to a first predetermined temperature to volatilize a portion of the hydrocarbon contaminants in the contaminated material;
    a second-stage heating unit for receiving the heated material from said first-stage heating unit;
    means for heating the material in said second-stage heating unit to a second predetermined temperature higher than said first predetermined temperature to volatilize substantially all of the remaining hydrocarbon contaminants in the contaminated material leaving substantially contaminant-free material;
    means for conveying the volatilized remaining contaminants from said second-stage heating unit to the heating means of said first-stage heating unit;
    means including the heating means of said first-stage heating unit for at least partially oxidizing substantially all of said remaining volatilized contaminants received from said second-stage heating unit;
    a separator;
    means for conveying gases from said first-stage heating unit including the portion of the contaminants volatilized in said first-stage heating unit, any remaining non-oxidized volatilized portion of said remaining contaminants from said second-stage heating unit and any air-borne particulate matter from the contaminated material to said separator, said separator separating the volatilized gases and the particulate matter one from the other into discrete exhaust streams, respectively; and
    means for eliminating the hydrocarbons in the volatilized exhaust gas stream from said separator.

2. An apparatus according to claim 1 including means for recombining the separated material and the substantially contaminant-free material at a temperature sufficient to eliminate any residual hydrocarbons on the separated material.

3. An apparatus according to claim 1 including a cooler, means for conveying the substantially contaminant-free material from said second-stage heating unit to said cooler whereby said cooler cools the substantially contaminant-free material.

4. An apparatus according to claim 1 wherein said means for eliminating the hydrocarbons in the volatilized exhaust gas stream includes means for oxidizing the latter exhaust gas stream, and means for disposing the volatilized exhaust gas stream from said separator and gases of oxidation from said oxidation means in heat exchange relation one with the other to preheat the volatilized exhaust gas stream before oxidizing the volatilized exhaust gas stream.

5. An apparatus according to claim 1 wherein said first-stage heating unit comprises a rotary drum having flights for elevating and cascading the material within the drum, said separator comprising a baghouse.

6. An apparatus according to claim 1 wherein said first-stage heating unit comprises a rotary drum having an inlet adjacent one end thereof for receiving the contaminated material, an outlet for the material adjacent the opposite end of the drum, a burner adjacent said opposite end of said drum for generating hot gases of combustion and an outlet for the gases adjacent said one drum end whereby the contaminated material and the hot gases of combustion are in counterflow heat exchange relation relative to one another in said first drum.

7. An apparatus according to claim 1 including means for moisturizing the substantially contaminant-free material.

8. An apparatus according to claim 7 including a cooler, means for conveying the substantially contaminant-free material from said second-stage heating unit to said cooler whereby said cooler cools the substantially contaminant-free material.

9. An apparatus according to claim 6 wherein said separator comprises a baghouse, said first drum comprising a rotary dryer having flights for elevating and cascading the material within the drum.

10. An apparatus according to claim 9 wherein said means for eliminating the volatilized exhaust gas stream from said separator includes means for oxidizing the latter exhaust gas stream, and means for disposing the volatilized exhaust gas stream from said separator and gases of oxidation from said oxidation means in heat exchange relation one with the other to preheat the volatilized exhaust gas stream before oxidizing the volatilized exhaust gas stream.

11. Apparatus for remediating contaminated soil comprising:
a first-stage heating unit for receiving the contaminated soil;
a burner for heating the soil in said first unit to a first predetermined temperature to volatilize a portion of the contaminants in the contaminated soil;
a second-stage heating unit for receiving the heated soil from said first unit;
a burner for heating the soil in said second unit to a second predetermined temperature higher than said first predetermined temperature to volatilize substantially all of the remaining contaminants in the contaminated soil leaving substantially contaminant-free soil;
means for conveying the volatilized remaining contaminants from said second unit to the burner of said first unit;
means including the burner of said first unit for at least partially oxidizing substantially all of said remaining volatilized contaminants received from said second unit;
a separator;
means for conveying gases from said first unit including the portion of the contaminants volatilized in said first unit, any remaining non-oxidized volatilized portion of said remaining contaminants from said second unit and any dust from the contaminated soil to said separator, said separator separating the volatilized gases and the dust one from the other; and
means for oxidizing the volatilized gases from said separator.

12. An apparatus according to claim 11 including means for returning the separated dust to the substantially contaminant-free soil, means for recombining the separated material at a temperature sufficient to eliminate any residual hydrocarbons on the separated dust.

13. An apparatus according to claim 11 including a cooler, means for conveying the substantially contaminant-free soil from said second dryer to said cooler whereby said cooler cools the substantially contaminant-free soil.

14. An apparatus according to claim 11 including means for disposing the volatilized gases from said separator and the gases of oxidation from said oxidizing means in heat exchange relation one with the other to preheat the volatilized gases from said separator before oxidizing the volatilized gases.

15. An apparatus according to claim 11 wherein said first unit comprises a rotary drum having flights for elevating and cascading the soil within the drum.

16. An apparatus according to claim 11 wherein said first unit comprises a rotary drum having an inlet adjacent one end thereof for receiving the contaminated soil, an outlet for the soil adjacent the opposite end of the drum, a burner adjacent said opposite end of said drum for generating hot gases of combustion and an outlet for the gases adjacent said one drum end whereby the contaminated soil and the hot gases of combustion are in counterflow heat exchange relation relative to one another in said first drum.

17. An apparatus according to claim 11 including means for moisturizing the substantially contaminant-free soil.

18. An apparatus according to claim 17 including a cooler, means for conveying the substantially contaminant-free soil from said second unit to said cooler whereby said cooler cools the substantially contaminant-free soil.

19. An apparatus according to claim 16 wherein said separator comprises a baghouse, said first unit comprising a rotary drum having flights for elevating and cascading the soil within the drum.

20. An apparatus according to claim 19 including means for disposing the volatilized gases from said separator and gases of oxidation from said oxidizing means in heat exchange relation one with the other to preheat the volatilized gases from said separator before oxidizing the volatilized gases.

21. A method for remediating soil contaminated with hydrocarbons comprising the steps of:
disposing soil contaminated with hydrocarbons in a first-stage heating unit;

heating the soil in said first unit to a first predetermined temperature to volatilize a portion of the contaminants in the contaminated soil;

disposing the heated soil from said first unit in a second-stage heating unit;

heating the soil in said second unit to a second predetermined temperature higher than said first predetermined temperature to volatilize substantially all of the remaining contaminants in the contaminated soil leaving substantially contaminant-free soil;

conveying the volatilized remaining contaminants from said second unit to the burner of said first unit;

at least partially oxidizing substantially all of said remaining volatilized contaminants received from said second unit by the burner of the first unit;

conveying gases from said first unit including the portion of the contaminants volatilized in said first unit, any remaining non-oxidized volatilized portion of said remaining contaminants from said second unit and any dust from the contaminated soil to a separator;

separating the volatilized gases and the dust one from the other in the separator; and oxidizing the volatilized gases separated in said separator.

22. A method according to claim 21 including returning the separated dust to the substantially contaminant-free soil, conveying the substantially contaminant-free soil from said second unit to a cooler, and cooling the substantially contaminant-free soil.

23. A method according to claim 21 including the step of oxidizing the volatilized gases from said separator, and disposing the volatilized gases from said separator and gases of oxidation in heat exchange relation one with the other to preheat the volatilized gases from said separator before oxidizing the volatilized gases.

24. A method according to claim 21 including the step of providing a baghouse for separating the volatilized gases and dust one from the other.

25. A method according to claim 21 wherein said first unit comprises a rotatable drum dryer, including the step of rotating said first drum dryer, elevating the soil therein and cascading the soil within said drum dryer through the hot gases of combustion.

26. A method according to claim 21, wherein said first unit comprises a rotatable drum dryer, including the steps of disposing a burner adjacent one end of said drum dryer, generating hot gases of combustion in said burner and flowing said hot gases of combustion and said contaminated soil in counterflow heat exchange relation relative to one another in said first drum dryer.

27. A method according to claim 21 including moisturizing the substantially contaminant-free soil.

28. A method according to claim 27 including cooling the contaminant-free soil from said second-stage heating unit.

29. A method according to claim 21 including the steps of disposing the volatilized gases from said separator and the gases of oxidation resulting from oxidation of the volatilized gases from the separator in heat exchange relation one with the other to preheat the volatilized gases from said separator before oxidizing the volatilized gases.

30. A method according to claim 21 including heating the soil in the first-stage heating unit to a temperature within a range of about 150°–450° F.

31. A method according to claim 21 including heating the soil in the second-stage heating unit to a temperature within a range of about 200°–1500° F.

32. A method according to claim 30 including heating the soil in the second-stage heating unit to a temperature within a range of about 200°–1500° F.

33. A method according to claim 30 including heating the soil in the second-stage heating unit to a temperature within a range of about 1000°–1100° F.

* * * * *